United States Patent [19]

Vassiliou et al.

[11] 4,130,675
[45] Dec. 19, 1978

[54] POLYARYLENE SULFIDE RESIN COATING METHOD

[75] Inventors: Eustathios Vassiliou, Newark, Del.; Edward J. Welch, Springfield, Pa.

[73] Assignee: E. I. Du Pont de Nemours and Company, Wilmington, Del.

[21] Appl. No.: 855,416

[22] Filed: Nov. 28, 1977

Related U.S. Application Data

[63] Continuation-in-part of Ser. No. 666,055, Mar. 11, 1976.

[51] Int. Cl.² .......................... B05D 1/36; B05D 3/02
[52] U.S. Cl. ................................... 427/333; 427/302; 427/375
[58] Field of Search ..................... 427/302, 333, 375

[56] References Cited

U.S. PATENT DOCUMENTS 3,948,865  4/1976  Brady et al. ............... 427/302 X
4,017,450  4/1977  Bailey ......................... 260/37 R

FOREIGN PATENT DOCUMENTS 827478  10/1975  Belgium ..................... 260/37R
1358428  7/1974  United Kingdom ........ 260/37 R Primary Examiner—James R. Hoffman

[57] ABSTRACT

The discoloration of finishes derived from coating compositions containing polyarylene sulfide resin can be significantly reduced by applying to the substrate a citrate, carbonate, sulfate or hydroxide of an alkali metal prior to applying the polyarylene sulfide resin composition.

3 Claims, No Drawings

POLYARYLENE SULFIDE RESIN COATING METHOD

CROSS-REFERENCE TO RELATED APPLICATION

This application is a continuation-in-part of application Ser. No. 666,055 filed Mar. 11, 1976.

BACKGROUND OF THE INVENTION

1. Field of the Invention

This invention relates to an improvement in coating compositions containing polyarylene sulfide resin. The improvement is the addition of a modifying compound which contains a monovalent alkali metal to the coating composition. Coatings produced by the improved coating composition can be lighter in color, if desired, than those produced by known polyarylene sulfide resin coating compositions.

2. Prior Art

Cookware which is non-stick because it is coated with resins of various sorts has come into widespread use in recent years. People prefer to use non-stick coated cookware because food is less likely to stick to it than to uncoated cookware, and because it is so easy to clean.

For coated cookware to have broad customer appeal, it should be available in a broad spectrum of colors ranging from the lightest to the darkest. Unfortunately, not all resins useful to produce non-stick coatings are available in such a broad spectrum. Polyarylene sulfide resin is one which is not; when polyarylene sulfide resin is baked and coalesced to produce a coating, it discolors to a dark tan color. To help overcome this discoloration, pigment, such as titanium dioxide, is mixed with the resin; however, this mixture produces a coating which, at best, is a light tan.

British Pat. No. 1,358,428, published July 3, 1974, discloses compositions containing flurocarbon polymers, polyphenylene sulfide, lithium hydroxide and cobalt octoate along with a pigment and a dispersing agent. The lithium hydroxide is used in crystallized from and is thought to improve the adhesion of the coating to the substrate. Pigments or carbon black are included in the examples of that British patent, and it does not teach a method of lightening the color of resultant coatings. Also, lithium hydroxide has been found to be inferior to compounds of other alkali metals in lightening the color of polyphenylene sulfide coatings.

SUMMARY OF THE INVENTION

In accordance with this invention, there is provided a coating composition comprised of:

(a) 100 parts by weight polyarylene sulfide resin;

(b) 4–80 parts by weight modifying compound which is a citrate, carbonate, sulfate or hydroxide of sodium, potassium, rubidium or cesium;

(c) 0–1250 parts by weight pigment;

(d) 0–1900 parts by weight fluorocarbon polymer; and (e) a liquid carrier.

Also in accordance with this invention, there is provided a process for producing light colored coatings of polyarylene sulfide resins which are produced by polyarylene sulfide resin coating compositions; the process comprising (1) placing upon a substrate a modifying compound composition which contains a citrate, carbonate, sulfate or hydroxide of sodium, potassium, rubidium or cesium; then (2) overcoating with a polyarylene sulfide resin composition; and then (3) heating until the polyarylene sulfide resin is fused.

DETAILED DESCRIPTION OF THE INVENTION

Polyarylene Sulfide Resin

The term "polyarylene sulfide" as used in this specification is intended to include arylene sulfide polymers of the type which are described in U.S. Pat. No. 3,354,129, issued Nov. 21, 1967, to Edmonds and Hill. As disclosed in that patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating composition of this invention, because of their high thermal stability and availability of the materials from which they are prepared, are those polymers having the repeating unit - R—S—, where R is phenylene, biphenylene, naphthylene, biphenylene ether, or a lower alkyl-substituted derivative thereof. By "lower alkyl" is meant alkyl groups having 1 to 6 carbon atoms, such as methyl, propyl, isopropyl, n-hexyl, and the like.

The preferred polymers used for coatings are those which have melting temperatures above about 200° C. These arylene sulfide polymers can have melting temperatures anywhere in the range from 200° to 500° C. Polymers of phenylene sulfide normally have melting temperatures in the range of about 300° C. to ;b 500° C. The preferred polymers have an inherent viscosity in chloronaphthalene at 206° C. of at least 0.1 deciliter per gram, preferably between 0.1 and 0.3, more preferably between 0.13 and 0.23; such polymers have been found to form very adherent, uniform coatings.

Modifying Compound

A modifying compound is one which contains a monovalent alkali metal selected from sodium, potassium, rubidium, and cesium. The alkali metals preferred for use, because of their higher efficiency, are potassium and sodium. The alkali metals are used in the invention as salts or bases. The salts or bases used include citrates, carbonates, sulfates, and hydroxides.

The modifying compound will be present in the coating composition per 100 parts by weight of polyarylene sulfide resin in a concentration of 4–80 parts, preferably 5–15 parts, more preferably 7–9 parts.

The concentration of modifying compound can also be calculated as parts by weight of the monovalent alkali metal portion of the modifying compound per 100 parts by weight of polyarylene sulfide resin. If this method of calculation is used, the concentration of the monovalent alkali metal portion will be 1.6–30 parts.

Examples of suitable modifying compounds include potassium citrate, sodium carbonate, potassium chloride, rubidium carbonate, cesium sulfate and potassium hydroxide.

A modifying compound composition can be made by dissolving the modifying compound in a liquid media which is compatible with the polyarylene sulfide resin coating composition. This composition then is mixed with the coating composition. The modifying compound also can be ground into the coating composition.

A modifying compound composition can also be effective by applying it alone and then overcoating it with a polyarylene sulfide resin coating composition instead of mixing it with the polyarylene sulfide resin coating composition.

Also, decorative patterns can be formed by selectively placing a modifying compound composition upon a substrate in a decorative pattern, and then overcoating it with a polyarylene sulfide resin coating composition and fusing the resin; this causes the areas of the baked coating over the modifying compound composition to be lighter than the areas not over the modifying compound composition.

It will be obvious that those alkali metal compounds toxic to humans should not be used in coatings that will come in contact with food. Such compounds should be restricted to other industrial uses.

For the above reason, the preferred compounds will be either approved by the United States of America Food and Drug Administration or be generally recognized as safe, compounds such as potassium citrate and sodium carbonate.

Fluorocarbon Polymer

While fluorocarbon polymers are not necessary in polyarylene sulfide resin coating compositions, their presence is preferred to enhance the characteristics of the coating produced.

The fluorocarbon polymer may be present in the coating composition per 100 parts by weight of polyarylene sulfide resin in a concentration of 0–1900 parts, preferably 35–160 parts, more preferably 70–90 parts.

The fluorocarbon polymers preferred are those of monoethylenically unsaturated hydrocarbon monomers completely substituted with fluorine atoms or a combination of fluorine atoms and chlorine atoms. Perfluoroolefin polymers useful with the present invention include polytetrafluoroethylene (PTFE) and copolymers of tetrafluoroethylene and hexafluoropropylene in all monomer unit weight ratios, fluorochlorocarbon polymers, such as polymonochlorotrifluoroethylene, and copolyers of tetrafluoroethylene and perfluoroalkyl vinyl ethers. Mixtures of these can also be used. PTFE is preferred for its thermal stability.

The fluorocarbon polymer used is particulate. The fluorocarbon polymer may be a micropowder, that is, have a particular size as small as 0.1 micron. However, the particles are preferably small enough to pass through the nozzle of a spray gun without clogging it, and also small enough to give the resulting film integrity.

The fluorocarbon polymer should have a number average molecular weight of at least about 20,000, for a polymer with a molecular weight of less than this tends to be waxy and unsuited for use. The number average molecular weight is preferably at least 200,000. Number average molecular weight of PTFE is measured by the method described by Suwa, Takehisa, and Mackie in *Journal of Applied Polymer Science*, Volume 17, pp. 3253-3257 (1973). The number average molecular weight of a tetrafluoroethylene/hexafluoropropylene copolymer is measured by first determining its melt flow rate (MFR) according to ASTM D 2116, using the MFR to determine melt viscosity (MV) according to the equation $$MV = \frac{Pi \times \text{pressure used (mm)} \times \text{orifice radius (mm)}}{8 \times MFR \times \text{orifice length (mm)}}$$

and then determining molecular weight (MW) according to the equation $$MW = \sqrt[3.4]{\frac{MV}{1.62 \times 10^{-13}}}$$

Number average molecular weight of a fluorochlorocarbon polymer is measured by ASTM D 1430.

Although a powder of fluorocarbon polymer can be used and a carrier provided separately, a polymer in the form of an aqueous surfactant-stabilized dispersion is preferred for its stability and because it is most easily obtained in that form. Dispersions of fluorocarbon polymers in organic liquids, such as alcohols, ketones, aliphatic or aromatic hydrocarbons, or mixtures of these, can also be used so long as the organic liquid is compatible with the total coating composition system.

Other Components of the Coating Composition

Generally a pigment or filler will be present in the coating composition. Any pigment ordinarily used in coating compositions can be used in a composition of the invention, although the benefits of the invention are minimized if darker pigments are employed. White pigments are preferred for their appearance. Typical of these are titanium dioxide, aluminum oxide, and calcium sulfate. Titanium dioxide is especially preferred for its hiding power. Usually, the pigment is incorporated with the arylene sulfide resin to form a dispersion in an intensive milling step. The pigment or filler can be the same particle size as the arylene sulfide resin. Suitable fillers include materials such as silica, talc, clay and mica.

In embodiments where pigments or filler are present, they are generally used in a ratio of 1 to 1250 parts, preferably 25–100 parts, more preferably 60–90 parts by weight per 100 parts of the polyarylene sulfide polymer.

The composition can also contain such conventional additives as flow control agents, surfactants, plasticizers, coalescing agents, etc., as are necessary or seem desirable. These additives are added for the usual reasons, in the usual way and in the usual amounts.

The amount of total solids in the coating composition will be governed by the substrate to which the composition is to be applied, the method of application, the curing procedures, and like factors. Ordinarily, when the composition is in a liquid medium, it consists of about 10–80% by weight of total solids.

Preparation of the Composition

The composition is made by first selecting the polyarylene sulfide resin, the modifying compound, the optional pigment or filler, the optional fluorocarbon polymer, and such conventional additives as may be used, and the amounts of these best suited to the purpose. This can be done with no trouble by one skilled in this art, using well known principles of formulation. Preparation of the composition is then a simple matter of making a mill base containing the pigment and polyarylene sulfide resin (using standard techniques well known in the art), and then mixing together the mill base, modifying compound, and the other components. As stated previously, another embodiment of this invention is the application of a modifying compound composition upon a substrate, and the application of the polyarylene sulfide resin composition as an overcoat so as to be able to selectively place the modifying compound under areas of the coating which are to be made light.

Preferably, the polyarlyene sulfide resin will first be formed as a dispersion in a suitable liquid, such as water or water soluble liquid such as glycols. A polyarylene sulfide resin having a particulate size of 40 mesh or smaller is preferred, although satisfactory results can be obtained with coarser material, for instance, 30 mesh or smaller. This particulate material and optional pigment are then formed into a dispersion in a suitable liquid, such as water, by means of intensive milling. This milling will generally reduce the arylene sulfide polymer particle size with the final particle size generally being below 100 mesh (standard U.S. sieve series), although, for the most part, the effect of the milling is to break up agglomerates rather than to reduce the particle size of the components drastically.

The intensive milling used in forming the arylene sulfide polymer dispersion can be accomplished by the use of a conventional ball mill, a conventional rod mill, or a vibrating ball mill. Balls or rods can be made of steel, ceramic materials made of burundum (a high-fired ceramic), and the like. If the particle size of the arylene sulfide polymer is small enough, it is also possible to produce the dispersion utilizing a high intensity impeller-type mixer, such as "Waring" blender. The milling time will generally be in the range of 4–72, preferably 10–25 hours, using a ball mill. With a vibrating ball mill, the times can be about 1/10 that of the regular ball mill.

A non-ionic surface-active agent may be included in forming the dispersion of the arylene suflide polymer in a liquid. Suitable non-ionic surface-active agents include ethoxylated alkylphenols, ethoxylated aliphatic alcohols, carboxylic esters, carboxylic amides, and polyoxyalkylene oxide block copolymers. Preferred materials are alkylphenoxypoly (ethyleneoxy) ethanol. Exemplary of such materials is the material sold by Rohm & Haas under the trademark "Triton X-100", wherein the alkyl is t-octyl and the mols of ethylene oxide are within the range of 9–10. The amount of non-ionic surface-active agent present in the arylene sulfide polymer dispersion will vary from 0.5 to 15, preferably 2–8 weight percent based on the weight of the liquid.

The modifying compound is prepared for use in the coating composition either by grinding it to reduce its particle size or by dissolving it in the mill base or in a suitable liquid which is compatible with the total system.

If a fluorocarbon polymer is to be added to the polyarylene sulfide resin composition, it can be added as a dispersion by merely mixing it with stirring, with the polyarylene sulfide composition or as a micropowder by milling it with the polyarylene sulfide resin during the intensive mill base preparation step.

The components of the coating composition are mixed with stirring, as stated previously, to form the coating composition.

Application of the Coating Composition

The coating composition can be applied to a substrate in any conventional manner, for example, spraying, roller-coating, dipping, doctor-blading; however, the preferred method is by spraying.

The substrate to be coated is preferably pretreated by grit-blasting, by the flame-spraying of metals, or by frit-coating, although a clean, smooth untreated substrate can also be used.

Sufficient composition is ordinarily applied to obtain a thickness of about 10–130 microns (dry) and then baked for a time and at a temperature sufficient to fuse the polymers used.

If a coating having a decorative pattern within it is sought, a modifying compound composition is applied upon a substrate by using any conventional method of applying ink, such as by intaglio offset or by silk screening. Sufficient modifying compound composition is ordinarily applied to obtain a thickness of 5–65 microns, and then overcoated with the polyarylene sulfide resin coating composition which is ordinarily applied in sufficient amount to obtain a thickness of about 10–130 microns (dry).

The substrate coated can be metal, e.g., iron, steel, aluminum, and the like, or ceramic, e.g., glass, porcelain, pottery, and the like.

Utility

The composition will be useful as a topcoat, a one-coat system, or a priming coat for metal and ceramic cookware, especially bakeware, but it can be used just as well on other ceramic or metal articles requiring lubricious surfaces, such as bearings, valves, wire, metal foil, boilers, pipes, ship bottoms, oven liners, iron soleplates, waffle irons, ice cube trays, snow shovels and plows, chutes, conveyors, dies, tools, such as saws, files, and drills, hoppers, and other industrial containers and molds.

The following Examples are illustrative of the invention. In the Examples, all parts and percentages are by weight unless otherwise stated.

EXAMPLE 1

(1) Prepare a polyphenylene sulfide resin mill base by adding together and then pebble milling for 18–24 hours

| | Parts by Weight |
|---|---|
| Ethylene glycol | 33.49 |
| Deionized water | 17.04 |
| Cellosolve ® (ethylene glycol monoethylether) | 11.92 |
| Isooctylphenoxypolyethoxyethanol | 2.55 |
| | Parts by Weight |
| Ryton ® VI PPS resin (polyphenylene sulfide sold by Phillips Petroleum Company) | 20.00 |
| Titanium dioxide pigment | 15.00 |
| | 100.00 |

(2) Prepare a comparative coating composition by mixing in order

| | |
|---|---|
| Mill base of (1) | 78.58 |
| Aqueous dispersion of polytetrafluoroethylene - 60% solids, containing 6% by weight isooctylphenoxypolyethoxyethanol | 21.42 |
| | 100.00 |

(3) Prepare a modifying compound solution by mixing and stirring

| | |
|---|---|
| Deionized water | 90.00 |
| Potassium citrate (monohydrate) | 10.00 |

-continued

| | |
|---|---|
| | 100.00 |

(4) Prepare a coating composition of the invention by mixing in order

| | |
|---|---|
| Mill base of (1) | 69.27 |
| Aqueous dispersion of polytetrafluoroethylene - 60% solids, containing 6% by weight isooctylphenoxypolyethoxyethanol | 18.88 |
| Modifying compound solution of (3) | 11.85 |
| | 100.00 |

(5) Spray sufficient comparative coating composition to obtain a thickness of 0.5–1.7mil (dry) onto an aluminum pan which has been pretreated by being grit-blasted with aluminum oxide to produce a surface roughness of 150–200 microinches.

(6) Spray sufficient coating composition of the invention to obtain a thickness of 0.5–0.7 mil (dry) onto an aluminum pan which has been pretreated by being grit-blasted with aluminum oxide to produce a surface roughness of 150–200 microinches.

(7) Bake both the coated pan of step (5) and the coated pan of step (6) for 15 minutes at 370° C. The resulting off-white finish of the pan of step (6) (the one coated with the coating composition of the invention) is significantly lighter in color than the light tan finish of the pan of step (5).

EXAMPLE 2

(1) Prepare a comparative polyphenylene sulfide coating composition adding together and then pebble milling for 60–72 hours

| | Parts by Weight |
|---|---|
| Ethylene glycol | 33.49 |
| Deionized water | 18.17 |
| Cellosolve ® (ethylene glycol monoethylether) | 11.92 |
| Isooctylphenoxypolyethoxyethanol | 2.55 |
| Ryton ® VI PPS resin (polyphenylene sulfide) | 13.19 |
| Titanium dioxide pigment | 9.89 |
| Fluorocarbon DLX-6000 (a fluorocarbon micropowder sold by E. I. du Pont de Nemours and Company) | 10.79 |
| | 100.00 |

(2) Prepare a coating composition of the invention by adding together and then pebble milling for 60–72 hours

| | |
|---|---|
| Ethylene glycol | 33.49 |
| Deionized water | 17.04 |
| Cellosolve ® (ethylene glycol monoethylether) | 11.92 |
| | Parts by Weight |
| Isooctylphenoxypolyethoxyethanol | 2.55 |
| Ryton ® VI PPS resin (polyphenylene sulfide) | 13.19 |
| Titanium dioxide pigment | 9.89 |
| Fluorocarbon DLX-6000 (a fluorocarbon micropowder sold by E. I. du Pont de Nemours and Company) | 10.79 |
| Potassium Citrate (monohydrate) | 1.13 |
| | 100.00 |

(3) Spray sufficient comparative coating composition of step (1) to obtain a thickness of 0.5–0.7 mil (dry) onto an aluminum pan which has been pretreated by being grit-blasted with aluminum oxide to produce a surface roughness of 150–200 microinches.

(4) Spray sufficient coating composition of step (2) to obtain a thickness of 0.5–0.7 mil (dry) onto an aluminum pan which has been pretreated by being grit-blasted with aluminum oxide to produce a surface roughness of 150–200 microinches.

(5) Bake both the coated pan of step (3) and the coated pan of step (4) for 15 minutes at 370° C. The resulting off-white finish of the pan of step (4) is significantly lighter in color than the light tan finish of the pan of step (3).

EXAMPLE 3

(1) Prepare the comparative coating composition of Example 1, step (2).

(2) Prepare a modifying compound composition by mixing and then rolling

| | Parts by Weight |
|---|---|
| Deionized water | 88.00 |
| "Carbopol" ® 934 (carboxy vinyl polymer, high molecular weight, hydrophilic, 100% solids) sold by B. F. Goodrich Chemical Company) | 2.00 |
| Then adding and rolling until clear | |
| Potassium citrate monohydrate | 10.00 |
| | 100.00 |

(3) Apply, using a silk screen, the modifying compound composition onto an aluminum pan which has been pretreated with aluminum oxide to produce a surface roughness of 150–200 microinches. Air dry the composition.

(4) Spray sufficient coating composition of step (1) over the product of step (3) to obtain a thickness of 0.6–0.8 mil (dry) and bake the pan for 15 minutes at 370° C.

The resulting finish is a light-tan color except for the areas over which the modifying compound composition was applied, those areas being an off-white. The result is off-white decorative pattern set off against a light-tan background.

What is claimed is:

1. A process for producing light colored coatings of polyarylene sulfide resin which are produced by polyarylene sulfide resin coating compositions; the process comprising
   (a) placing upon a substrate a modifying compound which is a citrate, carbonate, sulfate or hydroxide of sodium, potassium, rubidium, or cesium;
   (b) overcoating with a polyarylene sulfide resin composition; and then
   (c) heating until the polyarylene sulfide resin is fused.

2. The process of claim 1 wherein the coating composition comprises
   (a) 100 parts by weight polyarylene sulfide resin;
   (b) 0–1250 parts by weight pigment;
   (c) 0–1900 parts by weight fluorocarbon polymer; and
   (d) liquid carrier.

3. The process of claim 1 wherein the modifying compound composition contains potassium citrate, sodium carbonate, potassium chloride, rubidium carbonate, cesium sulfate, or potassium hydroxide.

* * * * *